(12) United States Patent
Kunigita et al.

(10) Patent No.: US 8,731,371 B2
(45) Date of Patent: May 20, 2014

(54) INFORMATION PROCESSING SYSTEM AND INFORMATION PROCESSING DEVICE

(75) Inventors: Hisayuki Kunigita, Kanagawa (JP); Seung-Hyun Lee, Seoul (KR); Taek-Joo Lee, Seoul (KR); Ju-Yeong Ji, Seoul (KR)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/388,340

(22) PCT Filed: Jun. 14, 2010

(86) PCT No.: PCT/JP2010/003921
§ 371 (c)(1), (2), (4) Date: Apr. 17, 2012

(87) PCT Pub. No.: WO2011/018873
PCT Pub. Date: Feb. 17, 2011

(65) Prior Publication Data
US 2012/0189272 A1 Jul. 26, 2012

(30) Foreign Application Priority Data
Aug. 12, 2009 (JP) .................................. 2009-187451

(51) Int. Cl.
*H04N 9/80* (2006.01)
*H04N 5/775* (2006.01)

(52) U.S. Cl.
USPC ............ 386/248; 386/230; 386/239; 386/244

(58) Field of Classification Search
USPC .................................. 386/239–248
See application file for complete search history.

(56) References Cited

U.S. PATENT DOCUMENTS

| | | | |
|---|---|---|---|
| 6,563,999 B1 | 5/2003 | Suzuoki | |
| 6,580,870 B1 * | 6/2003 | Kanazawa et al. ............ | 386/240 |
| 2002/0087984 A1 | 7/2002 | Maeda | |
| 2004/0098751 A1 | 5/2004 | Kobayashi | |
| 2004/0098754 A1 * | 5/2004 | Vella et al. .................... | 725/135 |
| 2005/0188414 A1 | 8/2005 | Shin | |
| 2007/0252913 A1 | 11/2007 | Minobe | |

(Continued)

FOREIGN PATENT DOCUMENTS

| | | |
|---|---|---|
| CN | 1662055 A | 8/2005 |
| CN | 101449582 A | 6/2009 |

(Continued)

OTHER PUBLICATIONS

Office Action issued for corresponding Korean Patent Application No. 10-2012-7006242, dated Mar. 20, 2013.

(Continued)

*Primary Examiner* — Hung Dang
(74) *Attorney, Agent, or Firm* — Matthew B. Dernier, Esq.; Gibson & Dernier LLP (57) ABSTRACT

A playback processing unit executes a playback process of content data. A control unit defines a display area for a communication tool to be executed, based on display instruction information that is defined in association with playback time information of the content data. The display processing unit uses a content image processed and played back and a text chat window of which a display area is defined, and generates an image for a display.

9 Claims, 9 Drawing Sheets

| | INFORMATION INDICATING COMMUNICATION TOOL EXECUTION ALLOWED OR NOT | INFORMATION INDICATING OVERLAP ALLOWED OR NOT | INFORMATION SPECIFYING DISPLAY AREA |
|---|---|---|---|
| TYPE 1 | OK | OK | NO |
| TYPE 2 | OK | OK | YES |
| TYPE 3 | OK | NG | YES |
| TYPE 4 | NG | — | — |

(56) References Cited

U.S. PATENT DOCUMENTS

| | | |
|---|---|---|
| 2007/0283403 A1 | 12/2007 | Eklund |
| 2009/0172780 A1* | 7/2009 | Sukeda et al. .................. 726/3 |
| 2009/0222572 A1 | 9/2009 | Fujiwara |
| 2012/0303374 A1 | 11/2012 | Shin |

FOREIGN PATENT DOCUMENTS

| | | |
|---|---|---|
| JP | 2002171452 A | 6/2002 |
| JP | 2007300270 A | 11/2007 |
| JP | 2007325248 A | 12/2007 |
| JP | 2008312244 A | 12/2008 |
| KR | 2002-0082623 A | 10/2002 |
| KR | 2009-0020386 A | 2/2009 |

OTHER PUBLICATIONS

Office Action issued for corresponding Japanese Patent Application No. 2011-526680, dated May 7, 2013.

Office Action issued for corresponding Taiwanese Patent Application No. 099121919, dated Oct. 14, 2013.

Office Action issued for corresponding Chinese Patent Application No. 201080034633.4, dated Dec. 3, 2013.

International Search Report for corresponding PCT Application PCT/JP2010/003921, dated Sep. 14, 2010.

International Preliminary Report on Patentability and Written Opinion for corresponding PCT Application PCT/JP2010/003921, dated Feb. 14, 2012.

* cited by examiner

| | INFORMATION INDICATING COMMUNICATION TOOL EXECUTION ALLOWED OR NOT | INFORMATION INDICATING OVERLAP ALLOWED OR NOT | INFORMATION SPECIFYING DISPLAY AREA |
|---|---|---|---|
| TYPE 1 | OK | OK | NO |
| TYPE 2 | OK | OK | YES |
| TYPE 3 | OK | NG | YES |
| TYPE 4 | NG | — | — |

| PLAYBACK TIME INFORMATION (min) (start_time)~(end_time) | TYPE |
|---|---|
| 0~15 | 1 |
| 15~60 | 2 |
| 60~90 | 3 |
| 90~120 | 4 |

FIG.8

| PLAYBACK TIME INFORMATION (min) (start_time)~(end_time) | AVAILABLE TYPE |
|---|---|
| 0~15 | 1, 2, 4 |
| 15~60 | 2, 4 |
| 60~90 | 3, 4 |
| 90~120 | 4 |

INFORMATION PROCESSING SYSTEM AND INFORMATION PROCESSING DEVICE

TECHNICAL FIELD

The present invention generally relates to technology used in information processing devices that process content data, and more particularly, to technology for executing a communication tool while playing back content data.

BACKGROUND ART

Services that deliver content data, such as images (moving images), music, or the like have become popular. Particularly in recent years, as a high-speed network environment has been build and improved, progressive download type services have been put into practical use, which allows one to download image data into amass storage device of an information processing device and to play back the data at the same time.

RELATED ART LIST

Patent Documents

[PATENT DOCUMENT NO. 1] U.S. Pat. No. 6,563,999

In a real world, one sometimes goes to a movie theater or goes to watch sport live with a friend. By watching a movie or sport live with a friend, one can share excitement or feeling together with the friend. However, there are difficult factors, such as, the adjustment of schedules or the like in reality. Particularly, it is difficult to get together with a friend in a distant place. Therefore, it is preferable to implement an environment where a plurality of persons can share excitement or feeling while watching a same movie, or a same sport competition or game, by using the Internet. In addition, even when watching different movies or sports, it is preferable to be able to share a virtual space with a friend by chatting or the like.

For example with text chat, text input by a user who participates in the chat is displayed in a chat window. In this process, it is sometimes not preferable to superimpose and display the chat window on a content image depending on content being played back.

SUMMARY OF THE INVENTION

In this background, a purpose of the present invention is to provide a technology for executing a communication tool in accordance with content being played back in an information processing device.

In order to address the aforementioned issue, an information processing system is provided according to an aspect of the present invention. In the information processing system, a plurality of information processing devices are connected via a network. The information processing device includes: a playback processing unit operative to execute a playback process of content data; a control unit operative to execute a communication tool; and a display processing unit operative to generate an image to be displayed on a display. The control unit defines a display area for a communication tool to be executed, based on display instruction information that is defined in association with playback time information of content data.

According to another aspect of the present invention, an information processing device is provided. The information processing device includes: a playback processing unit operative to execute a playback process of content data; a control unit operative to execute a communication tool; and a display processing unit operative to generate an image to be displayed on a display. The control unit defines a display area for a communication tool to be executed, based on display instruction information that is defined in association with playback time information of content data.

Optional combinations of the aforementioned constituting elements, and implementations of the invention in the form of methods, apparatuses, systems, recording mediums, computer programs, or the like may also be practiced as additional modes of the present invention.

According to the present invention, a technology for executing a communication tool in accordance with content being played back in a plurality of information processing devices is provided.

DETAILED DESCRIPTION OF THE INVENTION

Figure 1:
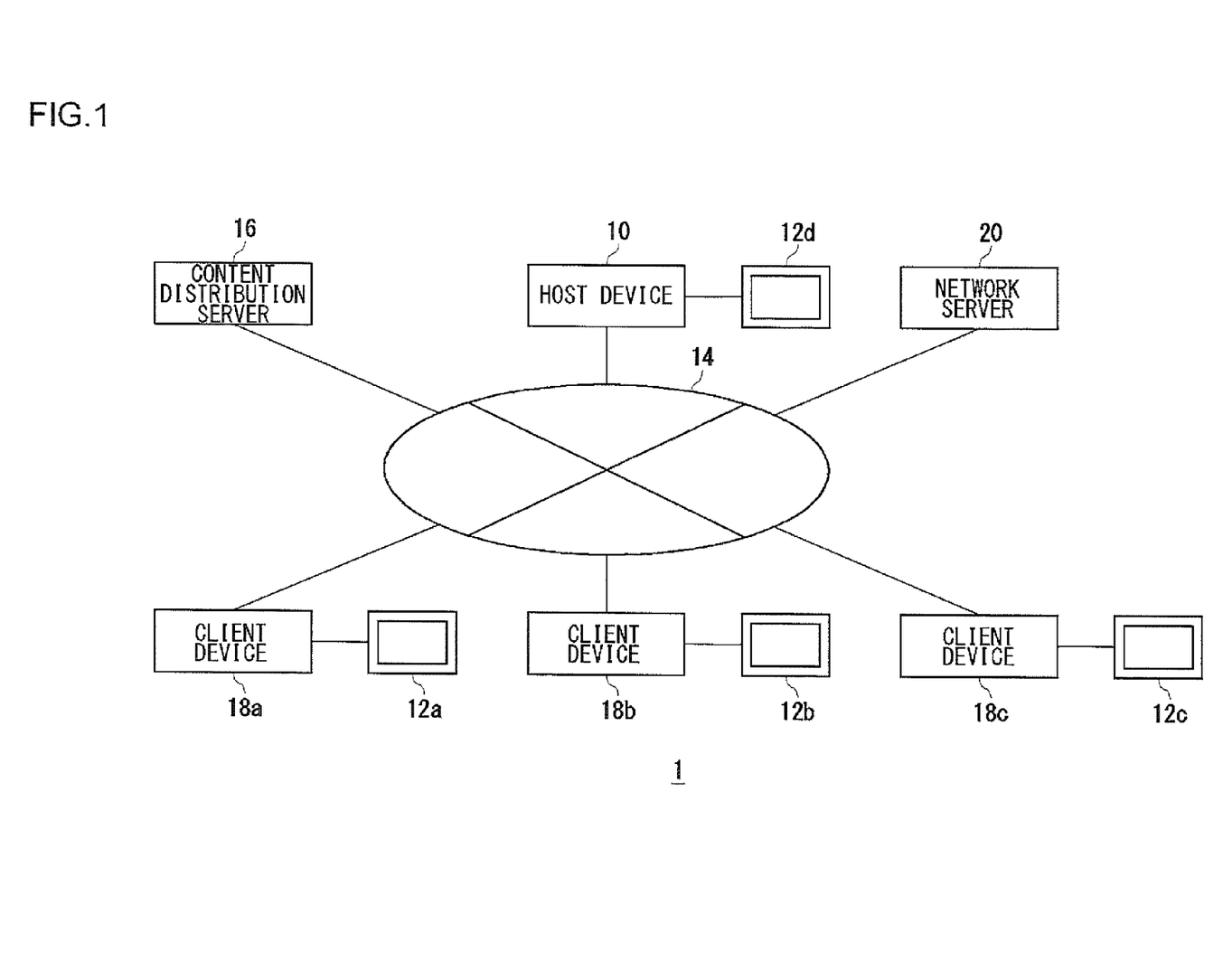
FIG. 1 shows an information processing system according to an exemplary embodiment of the present invention.

FIG. 1 shows an information processing system 1 according to an exemplary embodiment of the present invention. The information processing system 1 comprises a host device 10, a content distribution server 16, client devices 18a, 18b, and 18c (hereinafter referred to as a "client device 18" when referred collectively), and a network server 20. The host device 10, the content distribution server 16, the client devices 18, and the network server 20 are communicably connected with each other, via a network 14. The network 14 may be, for example, the Internet using TCP/IP protocol.

The client devices 18a, 18b, and 18c and the host device 10 comprise output devices 12a, 12b, 12c, and 12d (hereinafter referred to as an "output device 12" when referred collectively) for outputting processing results, respectively. The output device 12 may be a television provided with a display for outputting images and a speaker for outputting sound.

The content distribution server 16 is operated by a video distributing company or the like and provides the host device 10 and the client devices 18 with content data. For example, the content data may be AV data encoded in MPEG 2 format. The host device 10 and the client devices 18 acquire AV data, such as movies or the like, from the content distribution server 16 in progressive download format. This allows the host device 10 and the client devices 18 to download AV data into a storage unit that is configured with a hard disk drive or the like and to output images and sound to the output device 12 at the same time. The information processing system 1 according to the exemplary embodiment provides an environment where a plurality of persons feel as if watching a movie together while they are at separate locations. In the exemplary embodiment, the method for distributing content is not limited to the progressive download type. For example, content may be downloaded by streaming, or any method for distributing content that implements an environment where the host device 10 and the client devices 18 can play back content concurrently can sufficiently be applied to the exemplary embodiment.

The prevalence of a broad band network, which enables high-speed communication, allows information processing devices connecting to the Internet to send to and receive from each other data, for example, stream data (e.g., video data or audio data for chat) or text data by using a communication tool. Respective information processing devices play back received stream data for chat or received text data, by which, a chat system that shares a virtual space is established. The chat system enables the execution of text chat, voice chat, AV chat, which adds images to the voice chat, or the like. According to an aspect of the information processing system 1, while the network server 20 establishes a chat system, the host device 10 plays back content data (e.g., a movie or the like) while synchronizing the content data among a plurality of information processing devices including the host device 10 itself, by which, a virtual shared space is established.

In the information processing system 1, the host device 10, together with the client devices 18, operates as an information processing device that plays back content data, such as a movie or the like, while synchronizing. The host device 10 has a role for controlling a playback process of the client devices 18 in addition to the function for controlling a playback process of content data. For example, in the information processing system 1, in case that a plurality of users watch a same movie, an information processing device of one user may operate as the host device 10, and information processing devices of the other users may operate as the client devices 18. The function of the host device 10 may be implemented by a management server (not shown) connected with the network 14. In this case, the management server does not have to be provided with a function for the playback process of content data.

In the information processing system 1 in which a plurality of information processing devices are connected with the network 14, each information processing device, while executing a playback process of content data, executes a communication tool so as to send/receive information to/from other information processing devices that are grouped together. The communication tool is, for example, a chat tool, which allows users to chat with each other and thus a virtual shared space can be established.

Figure 2:
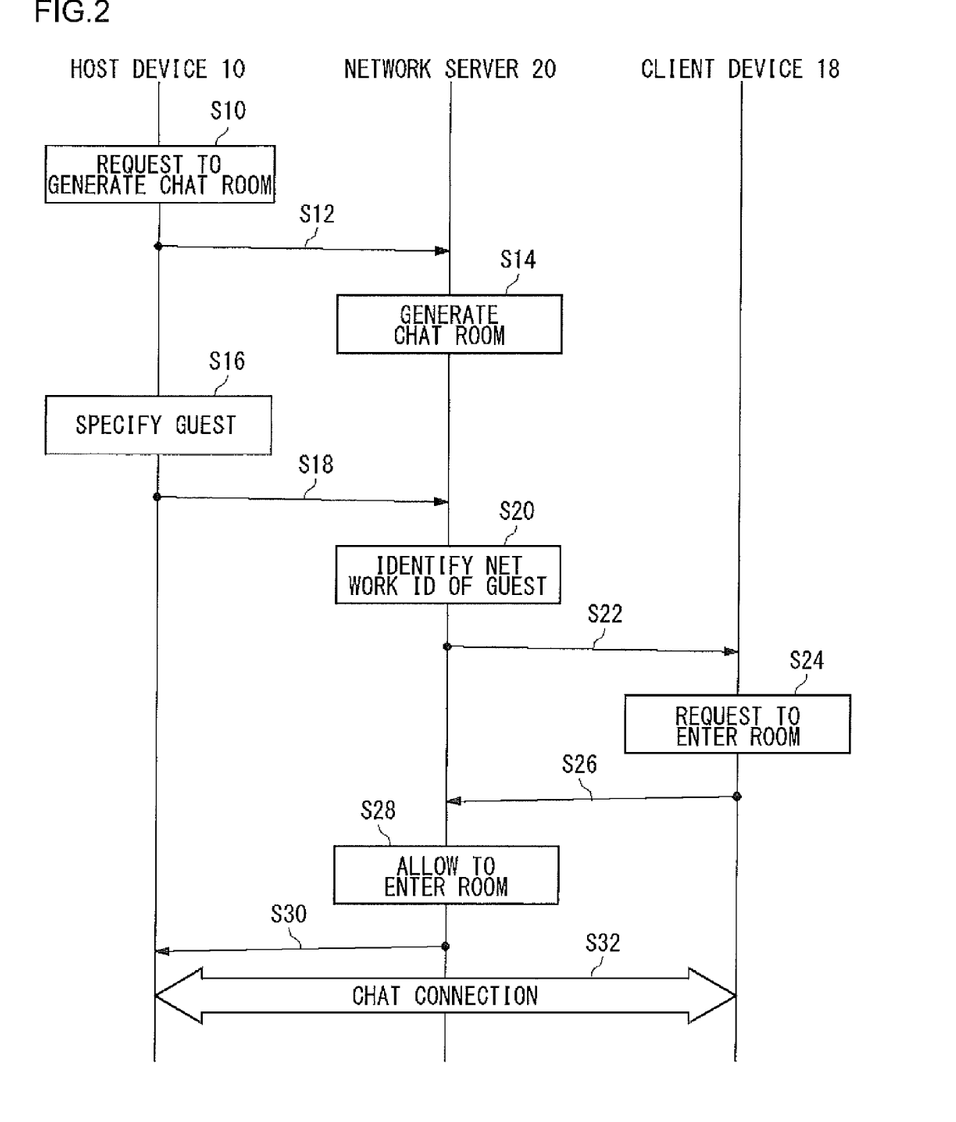
FIG. 2 is a sequence diagram showing an exemplary process of establishing connection for chat.

FIG. 2 is a sequence diagram showing an exemplary process of establishing connection for chat. The network server 20 manages the network ID, the address information, and the user ID of an information processing device that participates in the information processing system 1 in association with each others. First, the host device 10 creates a request for generating a chat room (S10). The request for generating a chat room is transmitted to the network server 20 (S12) and the network server 20 generates a chat room, accordingly (S14). The host device 10 has prepared beforehand and retains user IDs of a plurality of other users, selects a guest user to invite to the chat room (S16), and transmits the user ID of the guest user and an invitation message to the network server 20 (S18).

The network server 20 identifies the network ID of an information processing device (client device 18) of the guest user from the user ID of the guest user (S20) and transfers the invitation message to an address that is associated with the network ID (S22). The client device 18 generates a request for entering a room, which indicates that the user agrees to the invitation message (S24), and transmits the request to the network server 20 (S26). In response to the request, the network server 20 permits the guest user to enter the chat room (S28), and transmits the address information of the client device 18 to the host device 10 (S30). The host device 10 accesses to the client device 18 based on the transmitted address information and establishes connection for chat (S32). Thereby, a host user of the host device 10 and the guest user of the client device 18 can chat with each other.

The host device 10 performs a similar process with other information processing device, by which, a plurality of guest users can enter the chat room. Each of the client devices 18 is notified of address information of all users who enter the chat room, and the host device 10 and the client devices 18 transmit stream data or text data for chat to users who entered the room except the user who uses the device. Thereby, a plurality of users who enter the chat room are grouped, and the users can chat with each others.

The host device 10 retains address information of all users who enter the chat room. In the information processing system 1 according to the exemplary embodiment, the host device 10 notifies the content distribution server 16 of information that identifies content data to be requested to be progressively downloaded and of address information of all users who have entered the chat room, and the content distribution server 16 distributes the content data to all the notified addresses. Thereby, an environment in which the host device 10 and the client devices 18 play back content data while synchronizing is provided.

The host device 10 and the client devices 18 may transmit respectively to the content distribution server 16 the information that identifies content data to be requested to be downloaded together with the request for connection. The content distribution server 16 distributes the content data to the host device 10 and the client devices 18, the devices having transmitted the request for connection. In this manner, an environment in which the host device 10 and the client devices 18 play back content data while synchronizing may be provided.

In this process, the host device 10 may have notified content distribution server 16 of the address information of all users who enter the chat room in advance, and the host device 10 and the client devices 18 may respectively transmit to the content distribution server 16 the information that identifies content data to be requested to be downloaded together with the request for connection. The content distribution server 16 determines whether or not it is proper to respond to the request for connection transmitted from the host device 10 or one of the client devices 18 based on the address information notified in advance. More specifically, the content distribution server 16 may determine that it is proper to respond to the request for connection and may distribute the content data to the information processing device that transmits the request for connection if the address information of the information processing device is included in the plurality of pieces of address information notified in advance.

Figure 3:
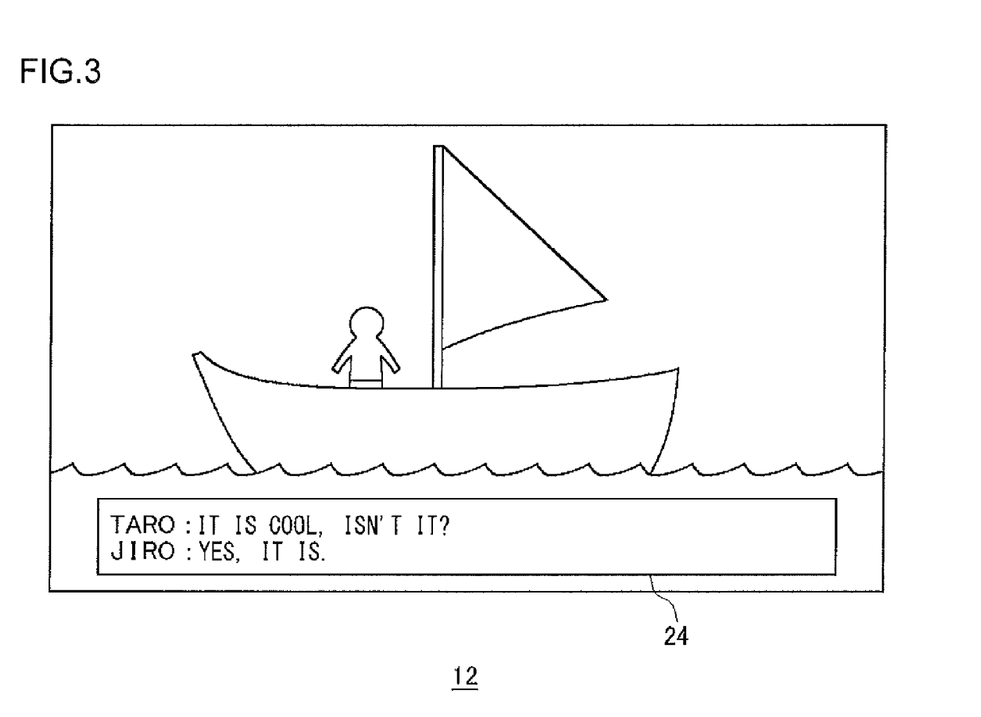
FIG. 3 shows an exemplary screen image of a movie being played back that is displayed on an output device.

FIG. 3 shows an exemplary screen image of a movie being played back that is displayed on the output device 12. On the screen image of the output device 12, a movie, which is being progressively downloaded, is played back and displayed, and a text chat window 24 for displaying text data, which the user or other user is input, is formed on apart of the screen image. Each user has a text input device, such as a keyboard or the like, and text data input through the text input device is transmitted to an information processing device of other user via the network 14. In this manner, the information processing system 1 may establish a text chat system so as to realize a virtual movie theater.

Text chat is an example of a communication tool supported by the information processing system 1, and a video chat may be executed instead of text chat. For example, each user has a camera and a microphone, and streams of image data captured by the camera and voice data acquired by the microphone are distributed to an information processing device of other user via the network 14. In this process, on a video chat window that is provided instead of the text chat window 24, an image of other user is displayed in real time and a voice is output in real time. As a communication tool, both text chat and video chat may be executed.

The information processing system 1 may further execute a group communication tool that uses the display of the output device 12 besides the text chat and video chat. For example, a shared site, such as, an electronic bulletin board, a moving image on which a comment can be written, or the like may be generated. In any case, a communication tool with which grouped users convey information with each other via the network 14 is executed in the information processing system 1.

Each information processing device generates the text chat window 24 that is an execution screen of chat while playing back and displaying a movie on a display, by which, a user can enjoy chatting with another grouped user while watching the movie. However, it is sometimes not preferable that a user can always define an area for displaying the text chat window 24 freely in view of the nature of content to be played back and displayed. In addition, sometimes a content creator or a content distributor would like to specify an area for displaying the text chat window 24 and it is not preferable to allow a user to display the text chat window 24 at the disposal of the user. In this background, the information processing system 1 provides an environment for answering the request from content creators or content distributors and for executing a communication tool appropriately, at the same time.

In the information processing system 1 according to the exemplary embodiment, a content distributor can define display instruction information for content data that the content distributor provides, the display instruction information determining whether or not the execution of a communication tool is allowed. The display instruction information is defined in association with playback time information of content data. An information processing device that plays back and displays content data controls a communication tool dynamically in accordance with the time information of content data being played back. The playback time information may be defined as a time period from the start time of contents, or maybe defined as the number of frames from the start frame of the contents. The display instruction information may be defined so as to change in accordance with the playback time information. For example, a communication tool may be prohibited from being executed only during a certain time period while content is played back. There are a plurality of types of display instruction information in the exemplary embodiment.

Figure 4:
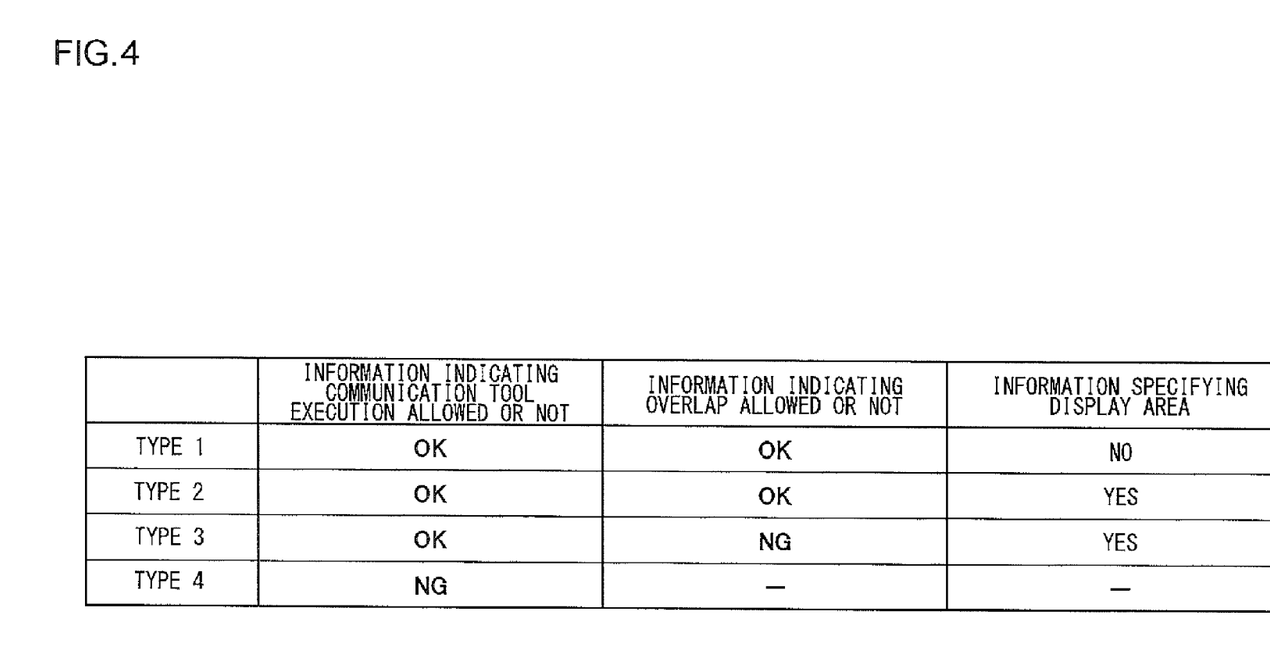
FIG. 4 is a diagram for illustrating a plurality of types of display instruction information.

FIG. 4 is a diagram for illustrating a plurality of types of display instruction information. In the exemplary embodiment four types of display instruction information, namely, type 1 to type 4, exist. The display instruction information includes information indicating whether or not the execution of a communication tool is allowed, information indicating whether or not an overlap is allowed, and information specifying a display area.

The information indicating whether or not the execution of a communication tool is allowed specifies whether or not it is allowed to execute a communication tool on a display on which a content image is displayed. The display instruction information of type 1-3 allows the execution of a communication tool on a display that is identical to a display for a content image. The display instruction information of type 4 does not allow the execution of a communication tool. As will be described later, the display instruction information of type 4 does not prohibit a communication tool from being executed on a display different from the display on which a content image is displayed.

Information indicating whether or not an overlap is allowed specifies whether or not it is allowed to superimpose a display area for a communication tool on a content image that is played back and displayed on a display. When the text chat window 24 is superimposed on a content image (cf. FIG. 3), a part of the content image is masked. For example, a content creator sometimes has a desire that the text chat window 24 is preferably not superimposed on an image in which a specific actor appears. On the other hand even for an identical content data, it is not a problem in some cases that the text chat window 24 is superimposed on a content image if the specific actor does not appear in the image. Therefore, a content creator defines information indicating whether or not an overlap is allowed in association with a scene of content, more specifically, with playback time information of the content data. For example, assume a case where it is not allowed to superimpose the text chat window 24 on a specific actor A, while it is allowed to superimpose the window 24 on another actor. In this case, for a scene in which the actor A appears, display instruction information indicating that the text chat window 24 is prohibited from superimposing on a content image is selected, and for the other scenes, display instruction information indicating that a superimposition is allowed is selected. In the example shown in FIG. 4, the display instruction information of types 1 and 2 allow an overlap and the display instruction information of types 3 rejects an overlap. In case a superimposition is not allowed, the display instruction information of type 4 described above, which determines that a communication tool is prohibited from being executed, may be selected.

The information specifying a display area is information that specifies an area on a display in which the display area for a communication tool can be defined. The display instruction information of types 2 and 3 restrict a displayable area of the text chat window 24 to an area that is a part of the display. On the other hand, the display instruction information of type 1 does not restrict the displayable area of the text chat window 24. In other words, the display instruction information of type 1 specifies substantially the entire area of the display as the displayable area of the text chat window 24. Since the display instruction information of type 1 does not restrict a display area for a communication tool, the display instruction information of type 1 is defined as information that does not specify an area for displaying in the example shown in FIG. 4. Meanwhile, the display instruction information of type 1 can also be viewed as information defining the entire area of the display as the area for displaying a communication tool. Described above is an example in relation with an actor A. For example, in the display instruction information of type 2, if an area that does not superpose on the actor A is specified as an displayable area of the text chat window 24, the content distributor can select the display instruction information of type 2 even for a scene in which the actor A appears.

FIGS. 5A-5D are diagrams for illustrating a displayable area of a communication tool defined by the display instruction information. Areas shown by hatching in FIGS. 5A-5D indicates display areas wherein an execution screen image of a communication tool can be set.

Figure 5A:
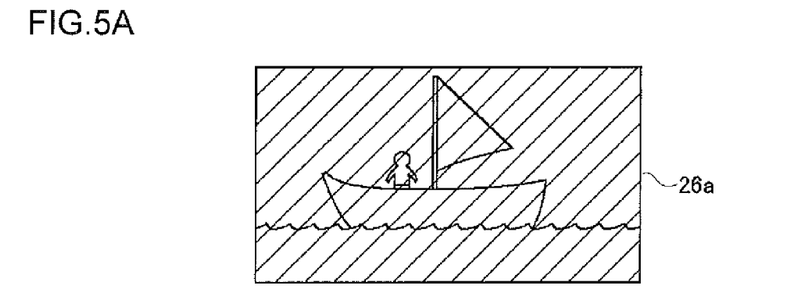
FIGS. 5A-5D are diagrams for illustrating a displayable area of a communication tool defined by the display instruction information.

FIG. 5A indicates a displayable area 26a of the communication tool, the area 26a being defined by the display instruction information of type 1. The displayable area 26a is the entire area of the display. That is, according to the display instruction information of type 1, the text chat window 24 is displayed over the entire area of the display. In case of being displayed over the entire area, the text chat window 24 is a translucent window and thus in practice, only text input as chat is displayed while overlapping on a content image.

Figure 5B:
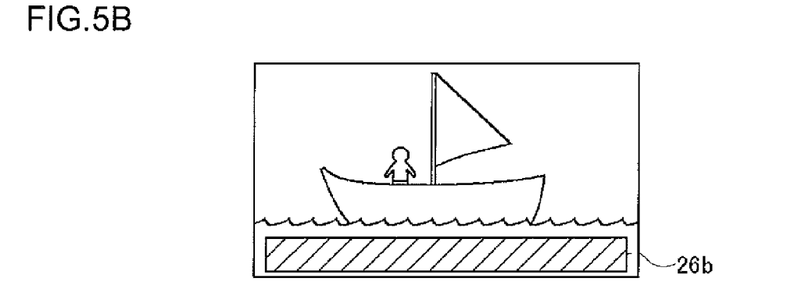

FIG. 5B indicates a displayable area 26b of the communication tool, the area 26b being defined by the display instruction information of type 2. The displayable area 26b is restricted to an area that is a part of the display. The area to be restricted may be defined for each of the display instruction information. According to the display instruction information of type 2, while the text chat window 24 is set in a restricted area on the display, the text chat window 24 can be overlapped on a content image.

Figure 5C:
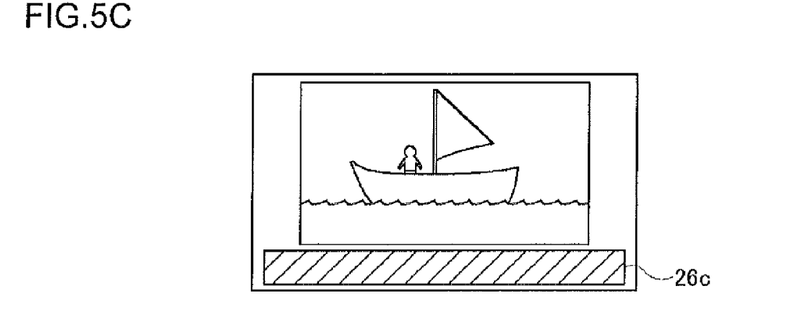

FIG. 5C indicates a displayable area 26c of the communication tool, the area 26c being defined by the display instruction information of type 3. The displayable area 26c is restricted to an area that is a part of the display so as not to superimpose on a content image. That is, according to the display instruction information of type 3, a content image is displayed in a reduced size and the text chat window 24 is set in a restricted area on the display. Thereby, an overlap between a content image and the text chat window 24 can be avoided.

Attribute information, which indicates that a user can freely define the size and the position of the text chat window 24, may be added to the display instruction information of type 1-3. In case that the attribute information is included in display instruction information, a user can arbitrarily move and adjust the text chat window 24 in a displayable area.

Figure 5D:
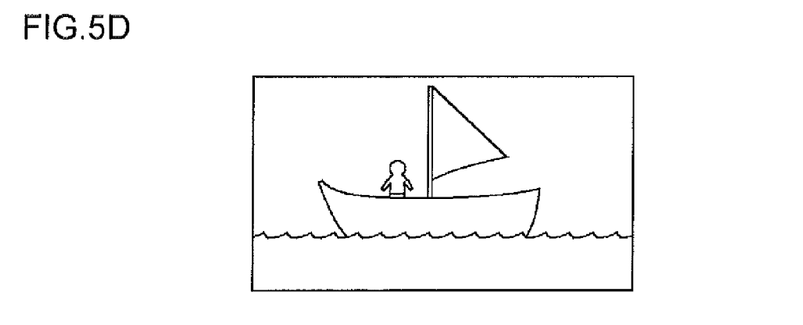

FIG. 5D shows an example wherein the communication tool is prohibited, by the display instruction information of type 4, from being executed on a display on which a content image is displayed. According to the display instruction information of type 4, the text chat window 24 is not displayed on the display of the output device 12. Although the text chat window 24 is not displayed on the display of the output device 12, the communication tool itself remains to be activated so that if the types are switched, the text chat window 24 is promptly displayed on the display of the output device 12.

Although FIGS. 5A-5D indicate about the type of the text chat window 24, voice chat continues to be executed during the execution of AV chat, regardless of the types. Attribute information, which indicates whether or not to allow the execution of voice chat, may be added.

Figure 6:
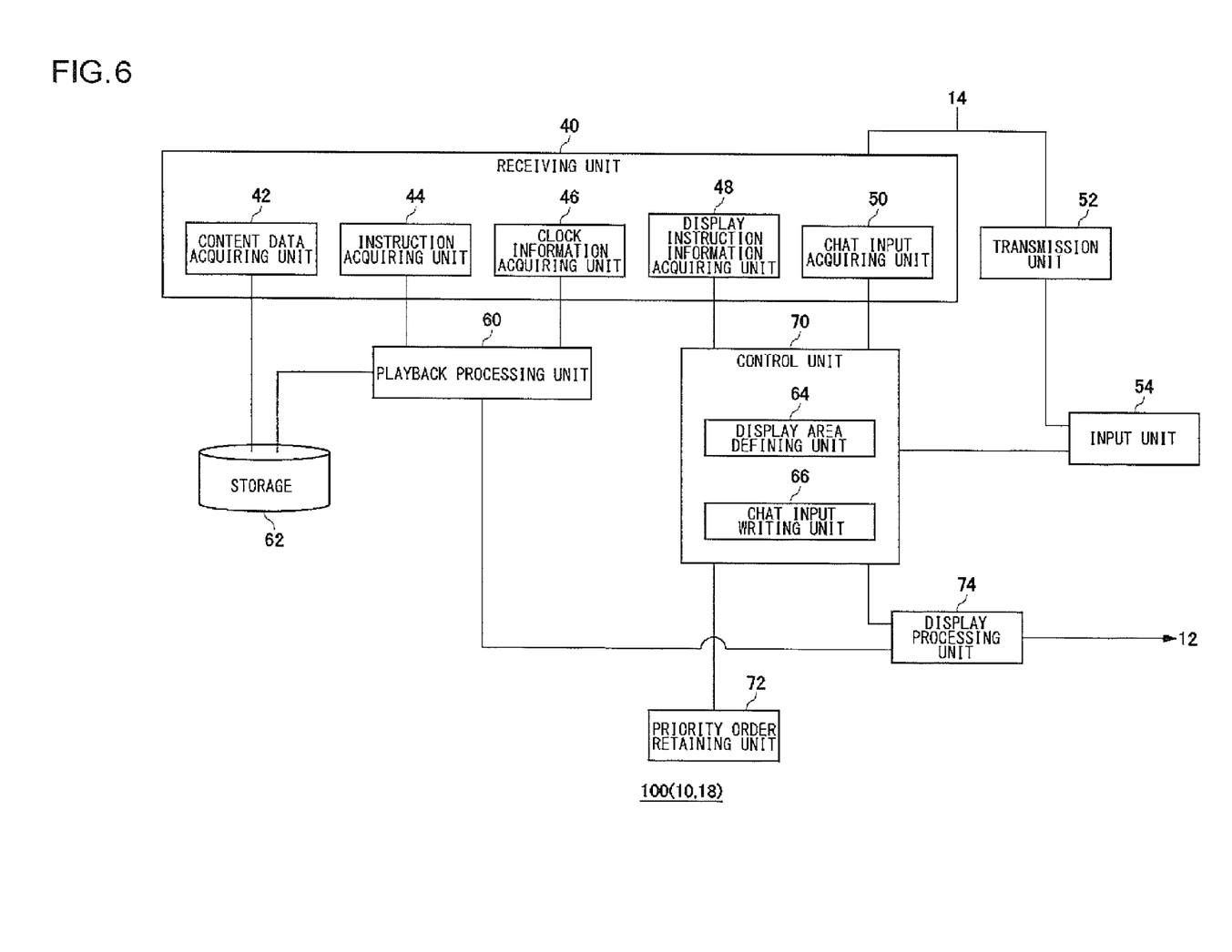
FIG. 6 shows a structure of an information processing device comprising a function for a playback process of content data and a function for executing a communication tool.

FIG. 6 shows a structure of an information processing device comprising a function for a playback process of content data and a function for executing a communication tool. The information processing device 100 comprises a receiving unit 40, a transmission unit 52, an input unit 54, a playback processing unit 60, a storage 62, a control unit 70, a priority order retaining unit 72, and a display processing unit 74. The receiving unit 40 is provided with a content data acquiring unit 42, an instruction acquiring unit 44, a clock information acquiring unit 46, a display instruction information acquiring unit 48, and a chat input acquiring unit 50. The control unit 70 is provided with a display area defining unit 64 and a chat input writing unit 66. The storage 62 may be configured with a mass storage device, such as a hard disk drive, or the like.

The elements depicted in FIG. 6 as functional blocks for performing various processes are implemented in hardware such as a CPU (Central Processing Unit), memory, or other LSI's, and in software such as a program etc., loaded into the memory. Therefore, it will be obvious to those skilled in the art that the functional blocks may be implemented in a variety of ways, by hardware only, software only, or a combination thereof.

In the information processing system 1, the host device 10 and the client devices 18 operate as an information processing device 100. FIG. 6 depicts functional blocks common to the host device 10 and the client devices 18. The host device 10 further comprises a control mechanism for playing back content data in the host device 10 and in the client devices 18 while synchronizing, the content data having been progressively downloaded.

By referring to FIG. 6, an explanation will be given below on a function for a playback process of content data in the information processing device 100 (e.g., the host device 10, the client device 18, or the like) and a function for executing a communication tool.

The host device 10 and the client devices 18 receive time information in NTP (Network Time Protocol) by the clock information acquiring unit 46, and synchronize time with another information processing device by using UTC (Universal Time Coordinated) as a reference time. The time synchronization based on NTP using UTC is indicated merely as an example. Therefore, the clock information acquiring unit 46 may synchronize time by acquiring another clock information that can be shared on the network 14. Alternatively, time may be synchronized among all the grouped information processing devices by using local clock information of one device included in the client devices 18 and the host device 10 as a reference time.

First, a host user selects a piece of content to watch, and the host device 10 generates an instruction for downloading that includes information for specifying the selected piece of content, and address information of the host device 10 and the client devices 18 that are the destinations of distribution, and sends the instruction to the content distribution server 16. As described above, the instruction for downloading may be sent from respective information processing devices to the content distribution server 16, together with the request for connection.

Upon receiving the instruction for downloading, the content distribution server 16 distributes content data to the host device 10 and the client devices 18 on the basis of the information for specifying content and the address information included in the instruction for downloading. Thereby, the host device 10 and the client devices 18 start downloading content data. The content data acquiring unit 42 acquires downloaded content data and stores the data into the storage 62.

The content distribution server 16 also transmits display instruction information defined in association with the playback time information of content data to the host device 10 and the client devices 18. A content ID is given to the display instruction information, and the host device 10 and the client devices 18 recognize that the content data to be distributed and the display instruction information correspond with each other.

Figure 7:
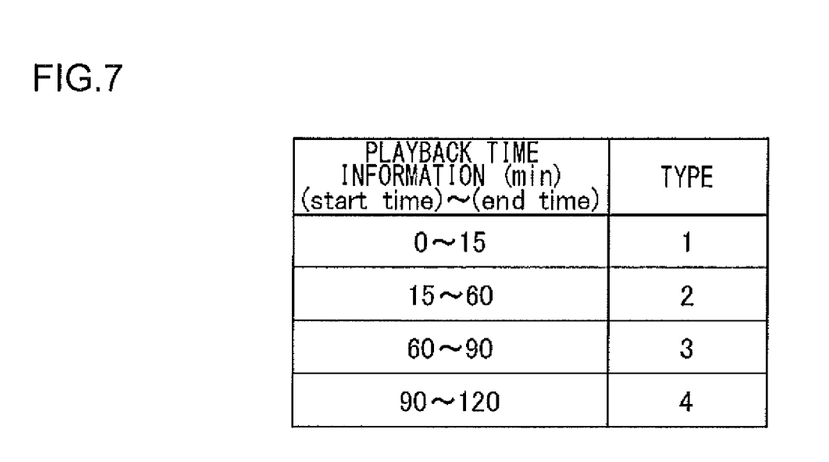
FIG. 7 shows an example of display instruction information transmitted to the information processing device.

FIG. 7 shows an example of display instruction information transmitted to information processing devices. The display instruction information is transmitted as an attribute file that associates the type and the playback time information of content data with each other. Information for each type shown in FIG. 4 may be included in the display instruction information. In this example, for a piece of content that is 120 minutes long, display instruction information of type 1 is defined for content images of play back time 0-15 minutes, display instruction information of type 2 is defined for content images of play back time 15-60 minutes, display instruction information of type 3 is defined for content images of play back time 60-90 minutes, and display instruction information of type 4 is defined for content images of play back time 90-120 minutes. The display instruction information acquiring unit 48 acquires display instruction information transmitted as an attribute file. This attribute file further includes information for specifying a display area or the like (not shown).

The playback time information may be represented by time for specifying time elapsed from the start frame of the content images, or may be represented by the number of frames provided that the number for the start frame is defined as 0.

Although the display instruction information may be transmitted from the content distribution server 16 separately from content data, the display instruction information may be embedded in the content data as attribute information. For example, in case the content data is transmitted in MPEG2TS format, the display instruction information may be transmitted by being included in PES (Packetized Elementary Stream), or may be defined in a SI (Service Information) table.

The host device 10 monitors the down load status of content data in the host device 10 and other client devices 18, and upon determining that data of which the amount is enough for playing back has been already downloaded, the host device 10 generates a playback instruction including playback start time and playback start frame information. In the information processing system 1, the time of the host device 10 and the client devices 18 are synchronized by using a clock that can be shared, for example by using UTC as a reference time, and the playback start time is represented by the shared clock time.

In the host device 10 and the client devices 18, the instruction acquiring unit 44 acquires the playback instruction. The playback processing unit 60 refers to time information provided from the clock information acquiring unit 46, reads out content data from the storage 62 on the basis of the playback start time and playback start frame information included in the playback instruction, and performs playback process, accordingly. Thereby, content is played back while being synchronized between the host device 10 and the client devices 18.

After the playback process is started in the playback processing unit 60, the content data acquiring unit 42 continues downloading and acquiring content data from the content distribution server 16 and stores the data into the storage 62.

The control unit 70 executes a communication tool. The control unit 70 executes a communication tool after the playback processing unit 60 starts the playback process of content data. Alternatively, the control unit 70 may execute a communication tool before the playback process is started. According to the exemplary embodiment, the control unit 70 executes chat as a communication tool. The control unit 70 retains instruction details of a plurality of types of display instruction information that is provided beforehand (cf. FIG. 4), and defines an area for executing chat, that is an area for displaying the text chat window 24, on the basis of the display instruction information acquired by the display instruction information acquiring unit 48.

The display area defining unit 64 acquires time information of content data being played back from the playback processing unit 60. This time information is information specifying time elapsed from the start frame of the content image, for example, the information may be the number of frames when the number for the start frame is defined as 0. The display area defining unit 64 refers to the attribute file shown in FIG. 7 on the basis of the time information of the content image being played back, and defines an area for displaying the text chat window 24.

In case the time information of the content image being played back is within the range of 0-15 minutes, the display area defining unit 64 identifies the display instruction information as type 1 and defines an area for displaying the text chat window 24 in the displayable area 26a shown in FIG. 5A. When the display instruction information is type 1, the display area defining unit 64 defines the area for displaying the text chat window 24 so as to superimpose over the entire content image. The display area defining unit 64 may configure the text chat window 24 so that a user can freely adjust the size and the position of the text chat window 24 as far as the window 24 is in the displayable area 26a. In this process, the user specifies the size and the position of the text chat window 24 by using a user interface, such as a mouse or the like. Upon receiving the specification input by the user, the input unit 54 provides the display area defining unit 64 therewith, and the display area defining unit 64 defines the area for displaying the text chat window 24. The display processing unit 74 renders the text chat window 24 over a content image processed and played back by the playback processing unit 60 in the area for displaying, the area being defined by the display area defining unit 64, so as to generate an image to be displayed on the display.

In case the time information of the content image being played back is within the range of 15-60 minutes, the display area defining unit 64 identifies the display instruction information as type 2 and defines an area for displaying the text chat window 24 in the displayable area 26b shown in FIG. 5B. When the display instruction information is type 2, the display area defining unit 64 defines the area for displaying the text chat window 24 so as to superimpose only on apart of the content image in accordance with information specifying a display area. The display area defining unit 64 may configure the text chat window 24 so that a user can freely adjust the size and the position of the text chat window 24 as far as the window 24 is in the displayable area 26b. The display processing unit 74 renders the text chat window 24 over a content image processed and played back by the playback processing unit 60 in the area for displaying, the area being defined by the display area defining unit 64, so as to generate an image to be displayed on the display.

In case the time information of the content image being played back is within the range of 60-90 minutes, the display area defining unit 64 identifies the display instruction information as type 3 and defines an area for displaying the text chat window 24 in the displayable area 26c shown in FIG. 5C. When the display instruction information is type 3, a content image is displayed in a reduced size and the text chat window 24 is defined in an area where a content image is not displayed. The display area defining unit 64 may configure the text chat window 24 so that a user can freely adjust the size and the position of the text chat window 24 as far as the window 24 is in the displayable area 26c. Upon being notified by the control unit 70 that the display instruction information is of type 3, the display processing unit 74 displays, in a reduced size, a content image processed and played back by the playback processing unit 60 and disposes the text chat window 24 in the area for displaying, the area being defined by the display area defining unit 64, so as to generate an image to be displayed on the display.

In case the time information of the content image being played back is within the range of 90-120 minutes, the display area defining unit 64 identifies the display instruction information as type 4. In this case, the display area defining unit 64 does not define an area for displaying the text chat window 24 on the display for displaying a content image.

When the type is switched in accordance with display instruction information, the display processing unit 74 determines, based on the type before switching and the type after switching, whether or not the size for displaying a content image is to be changed. In the example shown in FIG. 5, the size for displaying a content image is changed in case of switching from type 1, 2, or 4 to type 3, or in case of switching inversely thereto. In this process, the display processing unit 74 preferably does not switch the size for displaying promptly, but gradually reduces the size of the content image to be displayed or gradually increases the size of the content image to be displayed, so as not to bring discomfort to the user by the change in the size for displaying. For example, the display processing unit 74 may start a process of reducing or increasing of the content image size, a predetermined time period before a time point for switching types so that the change of the size is completed at the time point for switching. A predetermined effect may be applied to a content image of the size before switching and to a content image of the size after switching so as to decrease the discomfort given to the user when switching the size for displaying.

In a similar manner, when the types are switched in accordance with display instruction information, the display processing unit 74 determines, based on the type before switching and the type after switching, whether or not the area for displaying the text chat window 24 is to be changed. In the example shown in FIG. 5, the area for displaying is changed in case of switching from type 1 to type 2 or 3, or in case of switching inversely thereto. In this process, the display processing unit 74 preferably does not switch the area for displaying promptly, but processes so as the size of the area for displaying reduces or increases gradually. In case that the position of the area for displaying is changed, it is preferable to process so as the position moves gradually. For example, a process of reducing the size, increasing the size, or moving the position of the area for displaying, may be started a predetermined time period before a time point for switching types so as to be completed at the time point for switching. A predetermined effect may be applied to the area for displaying before switching and to the area for displaying after switching so as to decrease the discomfort given to the user when switching the areas for displaying.

The chat input acquiring unit 50 receives a chat input transmitted from another information processing device and passes to the chat input writing unit 66. The input unit 54 receives a chat input by a user via a user interface and passes to the chat input writing unit 66. The chat input writing unit 66 writes the name of a user who inputs a chat and chat text in the text chat window 24 in association with each other. Thereby, users can enjoy chatting while watching content.

Figure 8:
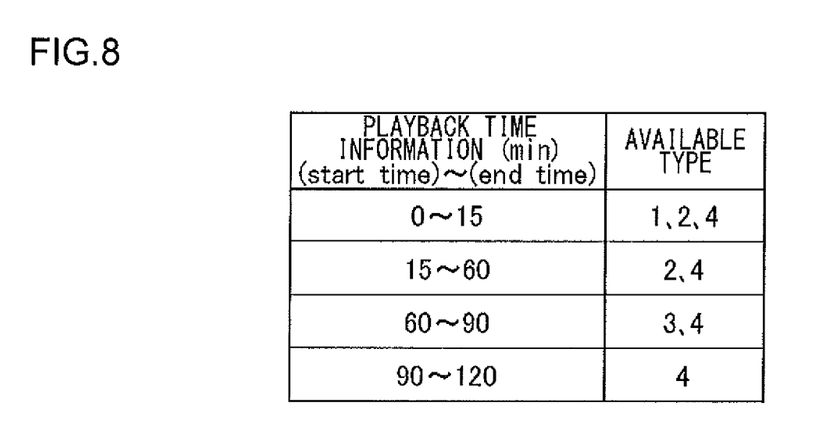
FIG. 8 shows another example of display instruction information transmitted to the information processing device.

FIG. 8 shows another example of display instruction information transmitted to the information processing devices. The display instruction information is transmitted as an attribute file that associates one or more types and the playback time information of content with each other. In comparison with the attribute file shown in FIG. 7, the attribute file shown in FIG. 8 differs in the point that the specification of type in display instruction information includes one or more available types. The available type indicates a type of display instruction information that can be used. For example, types 1, 2, and 4 are defined as available types for content images of play back time 0-15 minutes. Therefore, during this time period, the host device 10 and the client devices 18 can use one of the display instruction information of type 1, 2, or 4.

In case that a plurality of pieces of display instruction information are defined as available types, the priority order retaining unit 72 retains order for specifying display instruction information that is used preferentially. For example, order of precedence may be defined in the order type 1, 2, 3, 4. In this case, the type 1 has the highest priority, and the type 4 has the lowest priority. The order of type 1, 2, 3, 4 is the order corresponding to the degree of freedom in defining an area for displaying the text chat window 24, the order starting from the highest degree of freedom. If type 1 is defined as one of available types, type 1 is selected. Type 4 is not selected in case another type is available. Type 4 is selected in case only type 4 is defined as an available type.

The order of precedence is defined by a user in the host device 10 and in the client device 18. For example, the order of precedence is defined in the order type 1, 2, 3, 4 as a default setting, and a user can change the order of precedence. A user who does not prefer the superimposition between a content image and the text chat window 24 may define type 3 as having a top priority.

The display area defining unit 64 utilizes the order of precedence stored in the priority order retaining unit 72 and selects a type to be used, accordingly. If the order of precedence defined as a default setting is used in the example shown in FIG. 8, the types are determined to be identical to the attribute file shown in FIG. 7, as a result.

Figure 9:
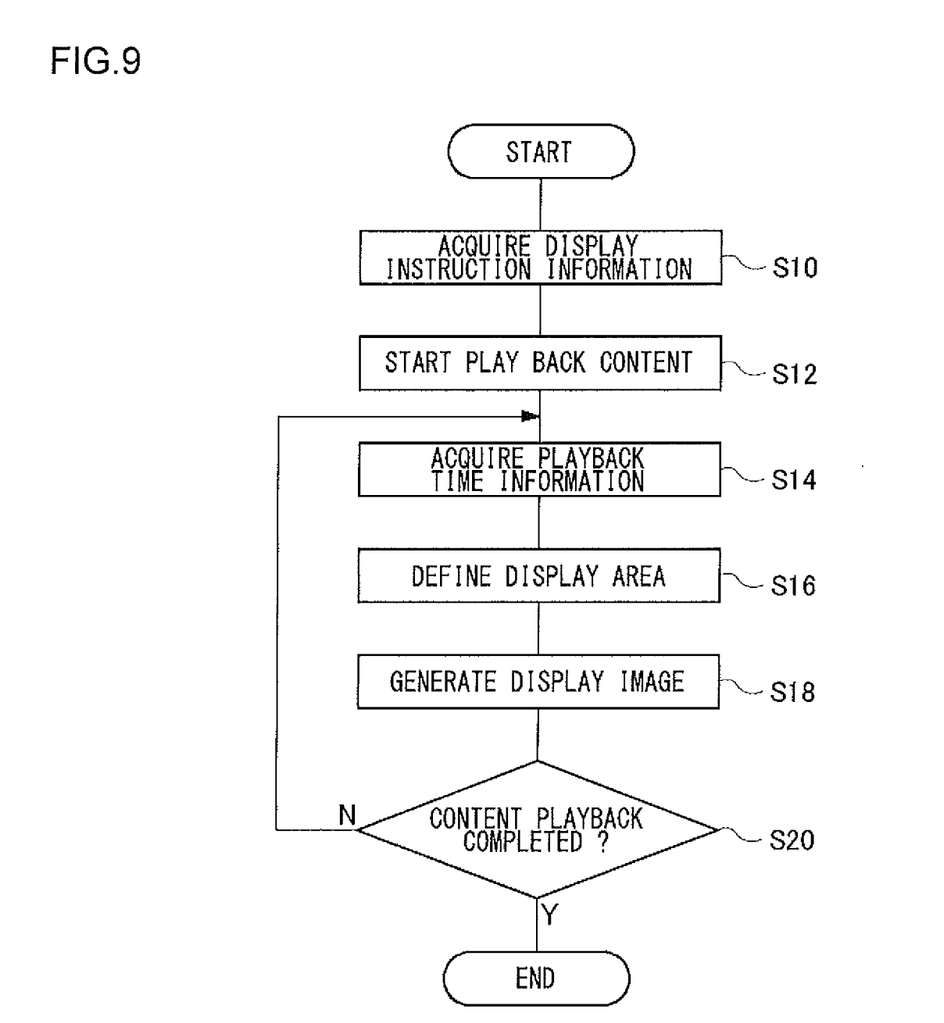
FIG. 9 shows a flowchart for controlling an execution process of a communication tool in the information processing device.

FIG. 9 shows a flowchart for controlling an execution process of a communication tool in the information processing device 100. The display instruction information acquiring unit 48 acquires display instruction information defined in association with the playback time information of content data from the content distribution server 16 (S10).

The playback processing unit 60 starts a playback process of the content data (S12). The display area defining unit 64 acquires the playback time information of the content data from the playback processing unit 60 (S14), identifies the type of display instruction information defined for the playback time information, and defines an area for displaying the text chat window 24 (S16). The display processing unit 74 combines a content image processed and played back by the playback processing unit 60 and the text chat window 24 of which a display area is defined by the display area defining unit 64, so as to generate an image to be displayed (S18). In the text chat window 24, the chat input writing unit 66 inputs chat text. The steps of S14-S18 are repeated until the playback process of the content is completed (N in S20). If the playback process of the content is completed (Y in S20), the flow ends.

Given above is an explanation based on the exemplary embodiments. These exemplary embodiments are intended to be illustrative only and it will be obvious to those skilled in the art that various modifications to constituting elements and processes could be developed and that such modifications are also within the scope of the present invention.

In the information processing system 1, a communication tool is executed in case that content data is progressively downloaded and the content is played back while being synchronized in the information processing devices 100 that are grouped. However, the communication tool according to the exemplary embodiment may also be executed and controlled under another environment. For example, a communication tool may be executed in case a plurality of users watch IPTV (Internet Protocol Television) concurrently, or identical content that has been already downloaded is played back while being synchronized. As an environment for executing the communication tool according to the exemplary embodiment, it is not necessary that a plurality of users play back identical content. The communication tool may be executed in case the users playback different pieces of content data, respectively. According to the exemplary embodiment, a plurality of users who are grouped use a communication tool. However, the users are not necessarily grouped in case of watching live broadcast on IPTV or in case of playing back different pieces of content data, etc.

As a variation of the exemplary embodiment, the information processing device 100 may display the text chat window 24 on a display different from the output device 12. For example, a different display may be provided in a mobile terminal device capable of wireless communication with the information processing device 100.

Figure 10:
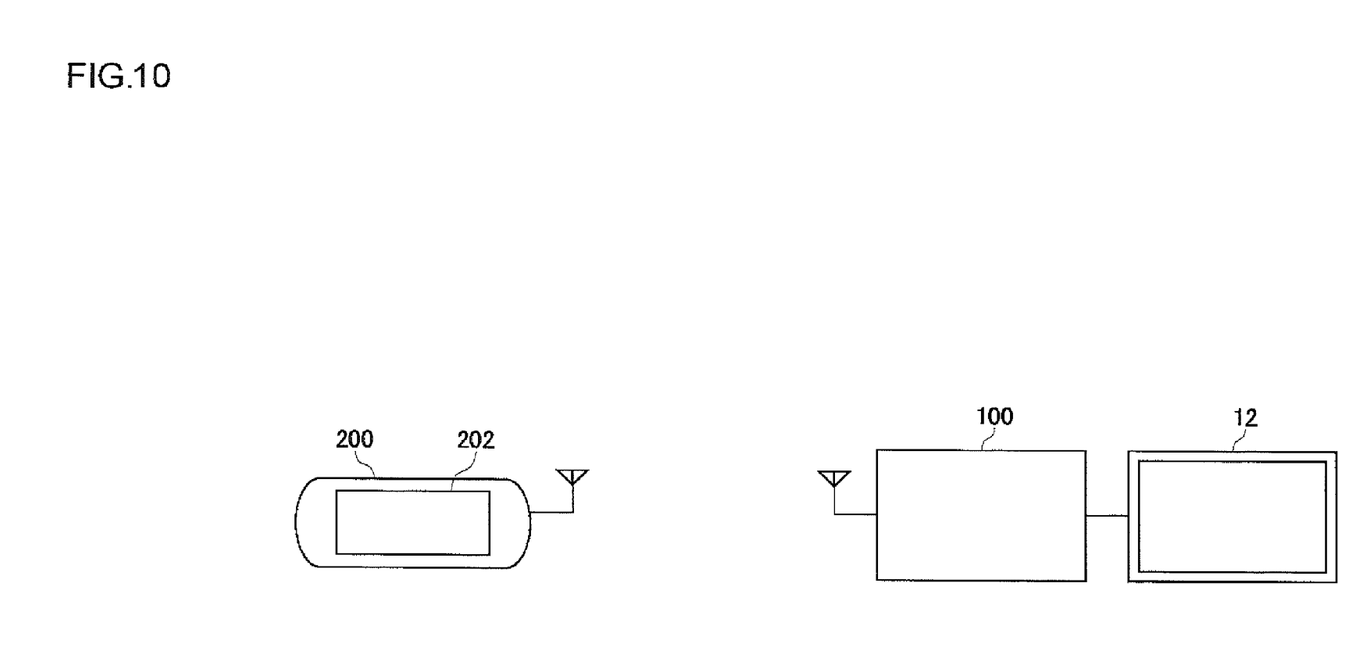
FIG. 10 shows a portable terminal device that is coupled with the information processing device.

FIG. 10 shows a portable terminal device 200 that is coupled with the information processing device 100. The terminal device 200 is provided with a display 202. In the information processing device 100, the control unit 70 defines an area for displaying the text chat window 24 on the display of the output device 12, and concurrently, defines an area for displaying the text chat window also on the display 202, regardless of the type of display instruction information. In this process, the area for displaying the text chat window may be defined on the entire area of the display 202. The terminal device 200 displays a chat window on the display 202, and the control unit 70 transfers the received chat input to the terminal device 200.

This allows users to chat by using the terminal device 200. For example, according to the display instruction information of type 4, the text chat window 24 cannot be displayed on the display of the output device 12. Therefore, the variation of the exemplary embodiment has an advantage that the users can chat with each other even in the aforementioned case.

In this process, the control unit 70 may control the definition of the text chat window 24 in accordance with the type of a display on which the text chat window 24 is to be displayed. For example, if only a TV is connected as a display, the display area defining unit 64 in the control unit 70 defines the area for displaying the text chat window 24, in accordance with the type instructed by the display instruction information. The control unit 70 identifies in advance the type of display device being connected. Information indicating the type of display device may be acquired by allowing the control unit 70 to inquire a display device when the display device is connected with the information processing device 100, or may be input by a user. One type of Information indicating the type is information indicating whether or not the device is a mobile terminal, and may further include information determining the size of the display, or the like. If a mobile terminal is not included in the connected display devices, the control unit 70 performs display control in accordance with the type instructed by display instruction information. On the other hand, if a mobile terminal is connected, the mobile terminal may be set as the display device for the text chat window 24 and the control unit 70 controls so that the text chat window 24 is displayed over the entire area of the display device, regardless of the display instruction information. The control unit 70 may perform display control while incorporating the status of the display device. For example, in case another application is activated in the mobile terminal, the control unit 70 may control so the text chat window 24 is displayed not over the entire area but on a part of the display device.

In case of displaying a text chat window on the terminal device 200, the need for displaying the text chat window 24 on the display of the output device 12 will be decreased. Therefore, for example, the user may define type 4 as having a top priority and may allow the priority order retaining unit 72 to retain the information thereof, so as not to allow the text chat window 24 to be displayed on the output device 12, but to allow the text chat window to be displayed on the display 202 of the terminal device 200.

In case that the user desires to display the text chat window 24 on the output device 12, it is also possible to configure so that chat is made via the terminal device 200 only if the type of display instruction information is, for example, type 4. In this case, it is an advantage that a user has to watch the display 202 of the terminal device 200 only when the text chat window 24 is not displayed on the output device 12.

The information processing device 100 according to the exemplary embodiment is assumed to play back a plurality of pieces of content data in some cases. For example, in case of playing back a CM (commercial) that is distributed for each user before watching a movie, it is preferable to be able to execute a communication tool while the CM is played back. Therefore, in the information processing system 1 according to the exemplary embodiment, display instruction information is generated for each piece of content data. In the aforementioned case, respective display instruction information for the CM and the movie are transmitted to the information processing device 100, and the information processing device 100 performs chat in accordance with the display instruction information. Thereby, the execution of communication tools reflecting the intention of content creators is realized appropriately.

DESCRIPTION OF THE REFERENCE NUMERALS

1・・・information processing system, 10・・・host device, 12・・・output device, 14・・・network, 16・・・content distribution server, 18・・・client device, 20・・・network server, 24・・・text chat window, 26・・・displayable area, 40・・・receiving unit, 42・・・content data acquiring unit, 44・・・instruction acquiring unit, 46・・・clock information acquiring unit, 48・・・display instruction information acquiring unit, 50・・・chat input acquiring unit, 52・・・transmission unit, 54・・・input unit, 60・・・playback processing unit, 62・・・storage. 64・・・display area defining unit, 66・・・chat input writing unit, 70・・・control unit, 72・・・priority order retaining unit, 74・・・display processing unit, 100・・・information processing device, 200・・・terminal device, 202・・・display.

The present invention can be applied to a technical field for processing content data.

The invention claimed is:

1. An information processing system wherein a plurality of information processing devices are connected via a network, wherein the information processing device comprises:
   a playback processing unit operative to execute a playback process of content data that is to be played back;
   a control unit operative to execute a communication tool with which grouped users convey information with each other via the network; and
   a display processing unit operative to generate a content image from the content data to be displayed on a display, wherein:
   the control unit defines a display area for the communication tool to be executed, based on a plurality of types of display instruction information, where each type of display instruction information defines respective display requirements, including: (i) whether or not the communication tool is permitted; and (ii) whether or not the display area for the communication tool is permitted to be superimposed on the content image for display on the display, each of the plurality of types of display instruction information is associated in an attribute table with a respective time period within the playback time of the content data during which the communication tool is permitted to be invoked in accordance with the respective type of display instruction information, where at least two of the respective times periods are different, and the control unit defines the display area for the communication tool to be executed based on the type of display instruction information and the associated time period from the attribute table, such that the display area for the communication tool is displayed in accordance with the respective display requirements of the plurality of types of display instruction information and the associated respective time periods within the playback time of the content data.

2. The information processing system according to claim 1, wherein the communication tool is a chat tool, and the control unit defines a display area of a chat window for the chat tool to be executed based on the type of display instruction information.

3. The information processing system according to claim 1, wherein in case that the type of display instruction information that is defined for content data to be played back indicates that it is allowed to superimpose the display area for the communication tool on the content image, the display processing unit generates an image to be displayed wherein the display area for the communication tool is superimposed on the content image.

4. The information processing system according to claim 1, wherein each of the types of display instruction information includes information that specifies a respective area on the display in which the display area for the communication tool is defined.

5. The information processing system according to claim 1, wherein in case that one or more of the plurality of types of display instruction information that are defined for the content data to be played back indicates that it is forbidden to superimpose the display area for the communication tool on the content image, the display processing unit generates an image to be displayed wherein the content image to be played back and displayed is scaled down and the display area for the communication tool is disposed in an area where the content image is not displayed.

6. The information processing system according to claim 1, wherein in case that one or more of the plurality of display instruction information that are defined for the content data to be played back indicates that the communication tool is not permitted to be executed on a display on which the content image is displayed, the control unit defines a display area for the communication tool on a display different from the display on which the content image is displayed.

7. The information processing system according to claim 1, wherein:

the control unit retains an order of precedence of the plurality of types of display instruction information, and the control unit determines which of the plurality of types of display instruction information to use based on the retained order of precedence.

8. An information processing device comprising:

a playback processing unit operative to execute a playback process of content data that is to be played back;

a control unit operative to execute a communication tool with which grouped users convey information with each other via the network; and a display processing unit operative to generate a content image from the content data to be displayed on a display, wherein:

the control unit defines a display area for the communication tool to be executed, based on a plurality of types of display instruction information, where each type of display instruction information defines respective display requirements, including: (i) whether or not the communication tool is permitted; and (ii) whether or not the display area for the communication tool is permitted to be superimposed on the content image for display on the display, each of the plurality of types of display instruction information is associated in an attribute table with a respective time period within the playback time of the content data during which the communication tool is permitted to be invoked in accordance with the respective type of display instruction information, where at least two of the respective times periods are different, and the control unit defines the display area for the communication tool to be executed based on the type of display instruction information and the associated time period from the attribute table, such that the display area for the communication tool is displayed in accordance with the respective display requirements of the plurality of types of display instruction information and the associated respective time periods within the playback time of the content data.

9. A non-transitory computer-readable recording medium containing a computer program, the computer program comprising:

a module configured to execute a playback process of content data that is to be played back;

a module configured to execute a communication tool with which grouped users convey information with each other via the network; and a module configured to generate a content image from the content data to be displayed on a display, wherein:

the module configured to execute the communication tool defines a display area for the communication tool to be executed, based on a plurality of types of display instruction information, where each type of display instruction information defines respective display requirements, including: (i) whether or not the communication tool is permitted; and (ii) whether or not the display area for the communication tool is permitted to be superimposed on the content image for display on the display, each of the plurality of types of display instruction information is associated in an attribute table with a respective time period within the playback time of the content data during which the communication tool is permitted to be invoked in accordance with the respective type of display instruction information, where at least two of the respective times periods are different, and the module configured to execute the communication tool defines the display area for the communication tool to be executed based on the type of display instruction information and the associated time period from the attribute table, such that the display area for the communication tool is displayed in accordance with the respective display requirements of the plurality of types of display instruction information and the associated respective time periods within the playback time of the content data.

* * * * *